United States Patent [19]
Jermyn

[11] 4,075,494
[45] Feb. 21, 1978

[54] ORALLY RECEPTIVE HOLDER FOR A DENTAL X-RAY FILM PAQUETTE

[76] Inventor: Arthur C. Jermyn, 99 Whitestone Lane, Rochester, N.Y. 14618

[21] Appl. No.: 745,562

[22] Filed: Nov. 29, 1976

[51] Int. Cl.$^2$ ............................................. G03B 41/16
[52] U.S. Cl. ..................................... 250/479; 250/444
[58] Field of Search ........................ 250/479, 444, 521

[56] References Cited

U.S. PATENT DOCUMENTS

| | | | |
|---|---|---|---|
| 2,553,028 | 5/1951 | Wright | 250/479 |
| 2,782,317 | 2/1957 | Vacanti et al. | 250/479 |
| 3,444,371 | 5/1969 | Via, Jr. | 250/479 |

Primary Examiner—Davis L. Willis
Attorney, Agent, or Firm—Lloyd F. Seebach

[57] ABSTRACT

A holder for a dental x-ray film paquette is shaped for oral reception and retention by the teeth or gums of a patient. The film paquette is maintained in an exposure position on the holder by frictional engagement with a slot in the holder or with a number of projections on either or each of the facing surfaces of the slot. The holder is also provided with means external of the mouth for indicating the generally central position of the film paquette to aid the technician in properly positioning the x-ray head.

13 Claims, 12 Drawing Figures

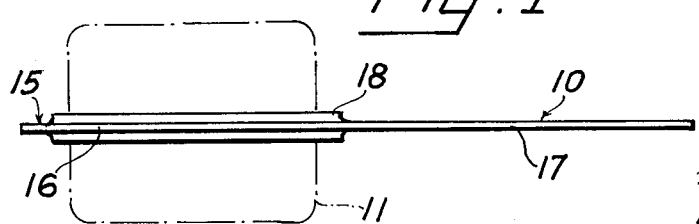
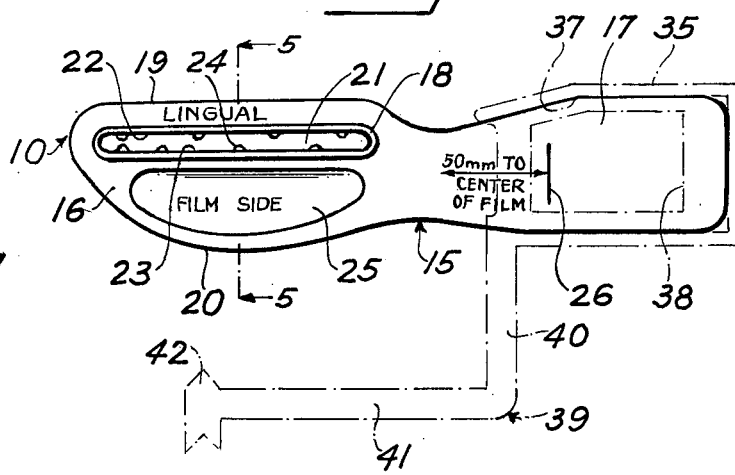
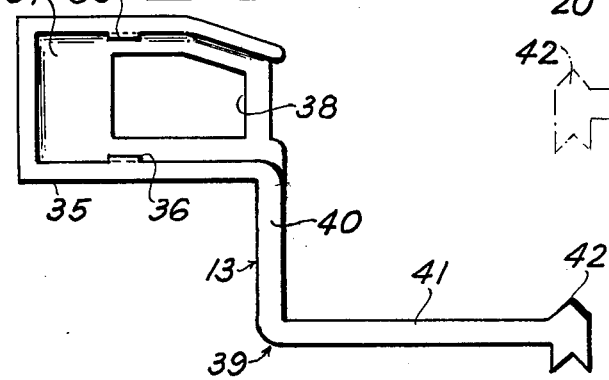
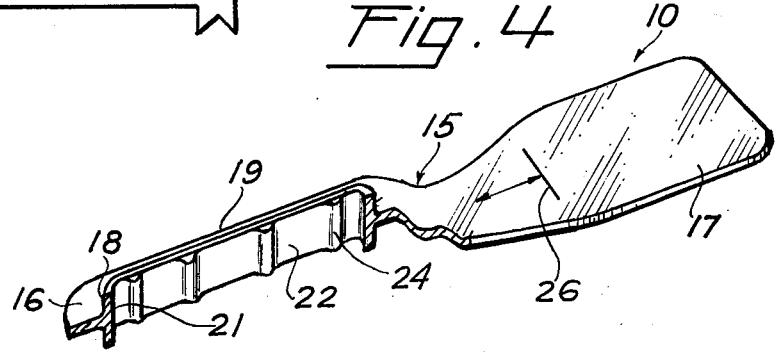
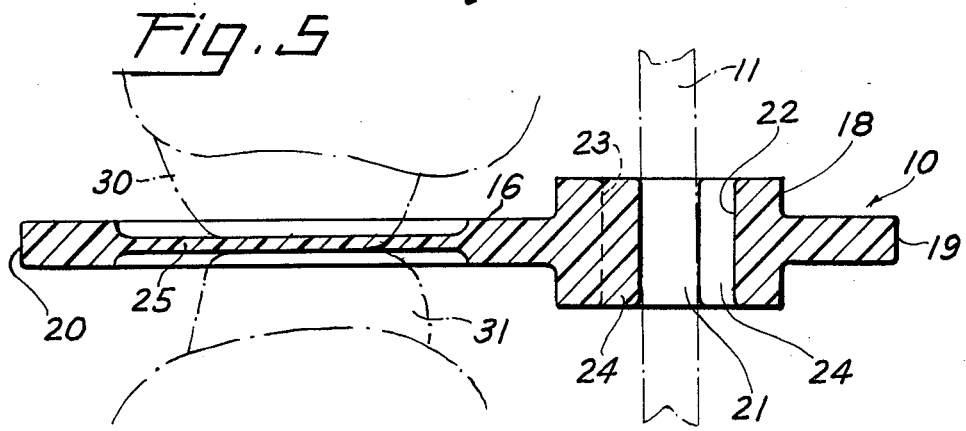

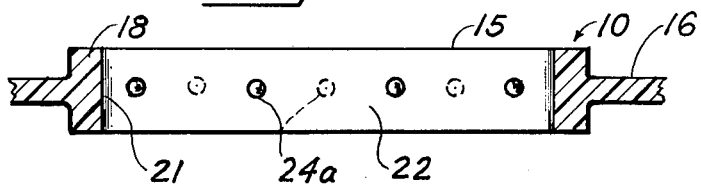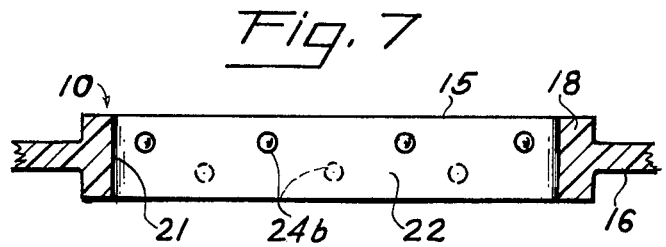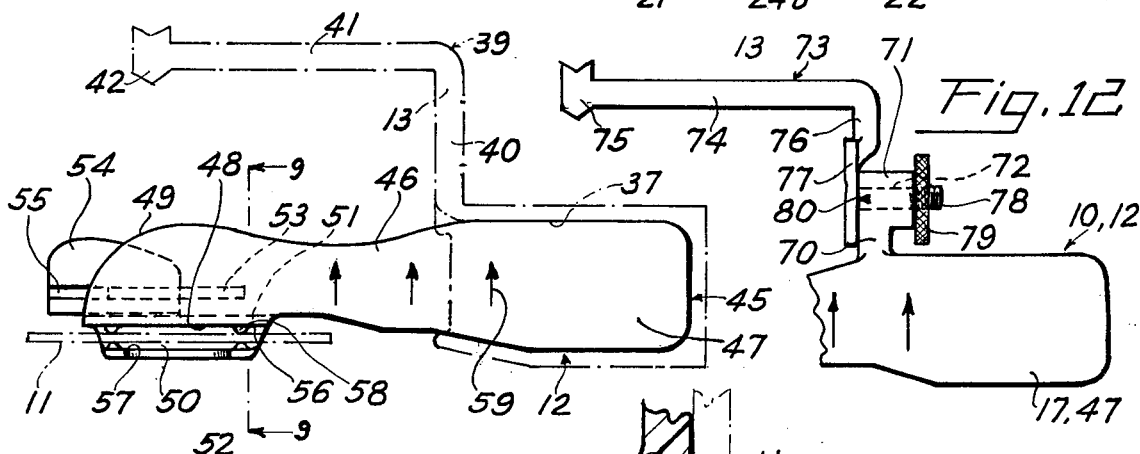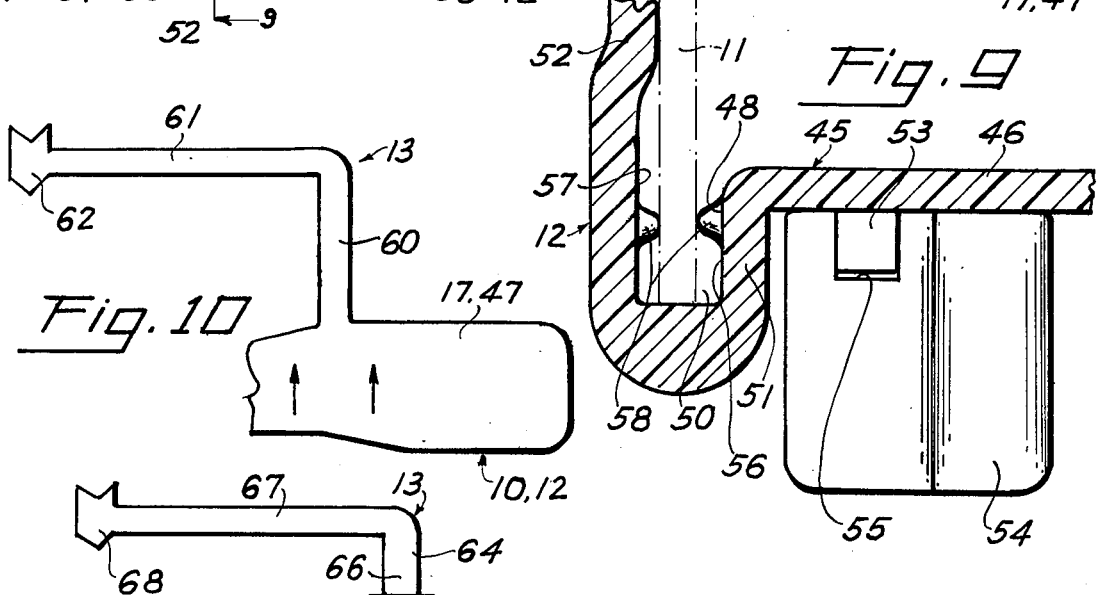

ORALLY RECEPTIVE HOLDER FOR A DENTAL X-RAY FILM PAQUETTE

FIELD OF THE INVENTION

The invention relates to dental x-ray techniques and apparatus and more particularly to a holder for a dental x-ray film paquette having a portion insertable into the mouth of a patient and retained therein by the patient's teeth or gums, the film paquette being supported on this portion and being positionable in an exposure relation to one or more teeth.

DESCRIPTION OF THE PRIOR ART

Holders for dental x-ray film paquettes are known in the art but have not achieved any wide use throughout the dental x-ray field. In most instances, the holders are most uncomfortable from the standpoint of the patient and unwieldly in use by the x-ray technician. As a result, most technicians still rely on the help of the patient for holding the film paquette in position relative to the preselected tooth or teeth being x-rayed. Such help consists in the main of the patient resorting to contortive feats with the index finger to hold and support or maintain the film paquette in position within the mouth. This must be held by the patient while the technician goes to the control booth, makes the exposure and then returns to retrieve the film paquette from the patient's mouth.

In addition, known types of holders do not insure that the film paquette, once in the patient's mouth, is still properly positioned at the time the exposure is actually made. As is well known, dental x-rays are made and used to determine any one of many conditions that might exist in the environs of a tooth or several teeth, such as, condition of the gum tissue, condition angle of the jaw bone, etc. For each such condition the exposure angle of the x-ray can be different. Consequently, it is extremely important that the technician know the exact position of the film paquette so additional exposures will not need to be made. The exact position of the film paquette cannot be seen by the technician when the x-ray head is being positioned adjacent the jaw prior to making the exposure. Hence, the technician must rely on some general and external area to insure proper location of the head relative to the film paquette that is concealed within the mouth. While the problem may be somewhat simplified by a direct exposure, that is, one made normal to the plane of the film paquette, it is not as simple when making an angular exposure because not only must the angle be correct but it is also essential that the film paquette be very accurately located and maintained in position until the exposure is made.

SUMMARY OF THE INVENTION

One object of the invention is to provide an orally receptive device for holding and retaining a dental x-ray film paquette within the mouth and in proper exposure relation to one or more preselected teeth.

Another object of the invention is to provide an orally receptive device for frictionally holding a dental x-ray film paquette on a portion of the device that is insertable in the mouth and engagable by the teeth for retaining the film paquette in proper exposure relation to one or more preselected teeth.

Yet another object of the invention is to provide an orally receptive device having a slot in which a dental x-ray film paquette is inserted and retained frictionally by projections spaced along the facing surfaces of the slot.

Still another object of the invention is to provide an orally receptive device having a first portion insertable within the mouth for holding a dental x-ray film paquette and a second portion for indicating externally of the mouth the generally central position of the film paquette within the mouth.

And yet another object of the invention is to provide an orally receptive device having a first portion for holding a dental X-ray film paquette and means on a second portion for determining externally of the mouth the generally central position of the film paquette within the mouth.

Other objects and advantages of the invention will be apparent to those skilled in the art by the description which follows.

The above objects of the invention are achieved by a member designated as a holder which comprises two major portions or parts. The holder is made of a slightly soft plastic material, the one or first portion of which is insertable in the mouth when a dental x-ray film paquette is arranged thereon and the second portion of which extends outside of the mouth. The first portion is shaped to conform generally to the inside of the mouth and has a straight edge and a generally concave edge that intersects the straight edge. Three holders are required for making a complete set of dental x-rays One holder is used for making bite-wings and two holders are used for making periapicals. For bite-wings the holder is merely flipped over for use on one side of the mouth or the other. For periapts, the holders are, in effect, right and left hand versions of the same holder, one being for the upper right and lower left sides and the other for the upper left and lower right sides. The first portion is provided with an elongated protuberance having a slot or with an open end channel. The facing surfaces of the slot or of the channel are provided with spaced projections which frictionally engage the surfaces of the film paquette when the latter is inserted therein. The second portion is provided with indicators or marks that are visible to the technician externally of the mouth when the first portion with the film paquette is inserted in the mouth. From these marks the technician can determine the generally central position of the paquette wthin the mouth. The second portion can also be provided with an indicator or pointer that is interconnected to the second portion and lies along and adjacent a cheek when the first portion with the film paquette is within the mouth. The pointer designates the exact plane of the first portion and the exact central position of the film paquette. As a result, the technician can accurately position the x-ray head for a direct or an angular exposure.

DESCRIPTION OF THE DRAWINGS

Reference is now made to the accompanying drawings in which like reference numerals designate like parts and wherein:

FIG. 1 is a side view of one embodiment of a holder for a dental x-ray film paquette in accordance with the invention;

FIG. 2 is a plan view of the holder shown in FIG. 1 together with a phantom indicator or pointer associated therewith;

FIG. 3 is a plan view of one form of indicator or pointer usable in conjunction with different embodiments of a holder for dental x-ray film paquettes;

FIG. 4 is a partial sectional view of the holder shown in FIG. 2 and disclosing particularly the projections spaced along one of the facing surfaces of a slot in the holder for frictionally engaging a film paquette inserted in such slot;

FIG. 5 is an enlarged sectional view of the holder shown in FIG. 2 and taken along the line 5—5 in FIG. 2;

FIGS. 6 and 7 are detail sectional views of a portion of the holder disclosed in FIG. 2 and showing other forms and spacings of the projections for frictionally engaging a film paquette;

FIG. 8 is a plan view of another embodiment of a holder for a film paquette with the indicator or pointer disclosed in FIG. 3 being shown in phantom;

FIG. 9 is an enlarged sectional view of the holder disclosed in FIG. 8 and taken along the line 9—9 in FIG. 8; and FIGS. 10, 11 and 12 are partial plan views of the holders disclosed in FIGS. 2 and 8 showing other means for associating an indicator or pointer with the holders.

DESCRIPTION OF THE PREFERRED EMBODIMENTS

With respect to FIGS. 1 and 2, a holder 10 is disclosed for frictionally engaging a dental x-ray film paquette 11. Such a film paquette is well known in the art and can contain any one of several types of x-ray film having different speeds or usable for different diagnostic purposes. For example, a bite-wing exposure is one made simultaneously of one or more opposed teeth in the upper and lower sets of teeth, particularly the molars and wisdom teeth. In this case, the film paquette 11 is positioned relative to the teeth so that when the film is exposed and developed, the teeth appear as in the mouth, that is, one over the other. As a result, the holder 10 can be used for holding a film paquette on either side of the mouth, the holder merely being flipped over because as seen in FIG. 1 the film paquette 11 is positioned centrally with respect to the plane of the holder.

When making periapical exposures of the front teeth, namely, the incisors, canines and bicuspids, the upper and lower sets of teeth cannot be x-rayed simultaneously. Hence, a holder 12 for the film paquette 11, as shown in FIG. 8, cannot be used interchangeably as the holder 10. The holder 12 must be of two forms, one holder being used for the upper left teeth and, when flipped over, for the lower right teeth, the other holder being a mirror image of the one holder and used for the upper right and the lower left teeth in the same manner as the one holder.

It is important to note that with each of the holders 10 and 12 disclosed in this application, the dental x-ray film paquette 11 is maintained in position on each respective holder by frictional engagement with a slot or channel, or with projections spaced along the facing surfaces of the slot or channel as described in more detail hereinafter. Further, the means interconnected to the holder for indicating or locating the x-ray head relative to the central position of the film paquette within the mouth can be associated with either of the holders 10 and 12. For this reason, the term "interconnected", as used herein, is meant to include a separate or an integral indicator or pointer 13, as is more fully described with respect to FIGS. 3, 10 and 11.

The holder 10 comprises a thin, flat plastic member 15 of a formed or molded shape best shown in FIG. 2. The member 15 comprises two coextensive portions 16 and 17, the first portion 16 supporting and holding the film paquette 11 and being insertable with the film paquette thereon in the patient's mouth. The second portion 17 serves as a means for handling and positioning the holder 10 and remains extending externally of the mouth for a purpose to be described hereinafter. The first portion 16 is provided with an elongated protuberance 18 that extends generally perpendicular from each surface of the member 15 and parallel to a straight edge 19 forming a part of the first portion. A concave edge 20 generally conforms in curvature to that of the mouth and intersects the edge 19, as seen in FIG. 2. The protuberance 18 is provided with a slot 21 which is of a length greater than the larger dimension of the film paquette 11 and of a width greater than the thickness of the film paquette 11. The facing surfaces 22,23 of the slot 21 are provided with a plurality of spaced, semi-cylindrical projections 24 which are alternately spaced and arranged as seen in FIGS. 2 and 4. The planes tangent to the apexes of the projections 24 on each facing surface are spaced from one another by a distance slightly less than the thickness of the film paquette 11. Hence, when the film paquette 11 is inserted in the slot 21, the projections 24 frictionally engage the respective surfaces of the film paquette for holding and supporting it is a position generally perpendicular to the plane of the member 15. The projections 24 extend the full depth of the protuberance 18. Also, as shown in FIGS. 6 and 7, the projections 24a and 24b can be semi-spherical, conical, or of any form and arranged in different relations on each of the facing surfaces 22 and 23. The projections 24, 24a and 24b can also be arranged along only one of the facing 22 or 23 in which case slot 21 need not be as wide.

As explained above, the holder 10 can be used for making bite-wing exposures. For this reason, the long dimension of the film paquette 11 extends in the same direction as the long dimension of the member 15. Also, since the slot 21 extends all the way through the protuberance 18, the film paquette 11 can be moved in the slot so it assumes a generally central position in a vertical direction relative to the plane of member 15, thereby permitting both the upper and lower teeth that have been preselected to be exposed simultaneously. It should also be pointed out that the means for holding and supporting the film paquette 11 can also comprise only a slot in the protuberance 18, such slot being of a width that permits the film paquette to be inserted therein and retained by the friction between the facing surfaces of the slot and the respective surfaces of the film paquette. If the member 15 is of sufficient thickness, the protuberance 18 can be extensive from only one surface of member 15 or can be eliminated completely.

The first portion 16 is also provided with an area 25 that is arranged between the protuberance 18 and the concave edge 20 as shown in FIG. 2. This area 25 is used as a bite area to bring the teeth in the upper and lower sets that are being x-rayed as close together at the bite line as possible. The second portion 17 is provided with an index or indicator line 26 which is utilized by the technician as is about to be described.

When the film paquette 11 is properly positioned in the slot 21 and is retained therein by the projections 24, the first portion 16 is placed in the patient's mouth and positioned relative to the preselected teeth to be x-rayed. The upper teeth 30 and the lower teeth 31 will then engage the area 25 and will hold and retain the film paquette 11 in exposure relation to the teeth, see FIG. 5. The second portion 17 is then external of the mouth and the index line 26 is visible to the technician. The x-ray head can then be positioned relative to the center of the film paquette within the mouth even though it is invisible to the technician. The line 26 provides a reference plane or mark for the technician relative to which the x-ray head is set. After the exposure, the holder 10 is removed, the film paquette is taken out of the slot 21 for development and another film paquette inserted in the slot. The holder 10 can be used with respect to either side of the mouth merely by flipping it over, as is evident from FIG. 5.

As mentioned above, direct and angular exposures can be made of the teeth and their environs. Since the film paquette is not visible to the technician when the x-ray head is being positioned relative thereto, it has been found that the line 26 does not always provide the accuracy of location for the head that is required in certain instances. Hence, the indicator or pointer 13 is provided as a more exact expedient. The pointer 13 comprises a recess portion 35 having a number of nibs 36 for engaging and retaining at least some part of the second portion 17, see FIG. 2. One side of the recess portion is open to receive the second portion 17 and the other side 37 is at least partially closed with the exception of an opening 38 which permits the line 26 to be visible to the technician as a possible check. The pointer 39 per se comprises an L-shaped extension, the one leg 40 joining the other leg 41 to the recess portion 37. The leg 41 carries an arrow 42 for indicating the central position of the film paquette in the slot 21 of the holder 10 as well as the plane of the member 15 inasmuch as the legs 40 and 41 are generally coextensive with the member 15. When the holder 10 with the film paquette 11 and the indicator 13 have been assembled and the portion 16 has been positioned within the patient's mouth, the arrow 42 then indicates, outside of the mouth, the exact spot adjacent the patient's cheek where the cone on the x-ray head should be positioned. The legs 40 and 41 provide a visible plane to the technician for accurately and correctly positioning the x-ray head to make either a direct or an angular exposure. Since the holder 10 and the indicator 13 are of a plastic material, there is no problem presented with respect to the x-ray exposure.

For a periapical exposure, a holder 45 is provided in two forms, one being a mirror image of the other as described above. Only one such holder is disclosed inasmuch as one skilled in the art would be well aware of the problem involved. The holder 45 comprises a first portion 46 and a second portion 47, one being coextensive with the other. The first portion 46 has a straight edge 48 and a concave edge 49 that intersects the straight edge. An open end, U-shaped channel 50 is arranged along and parallel to the straight edge 48 and is of a width greater than the thickness of the film paquette 11. The channel 50 is formed by a leg 51 that extends in one direction generally perpendicular to the plane of the first portion 46. A leg 52 is spaced from and integral with leg 51, the juncture being spaced from the plane of the first portion 46 in the one direction with the leg 52 extending from the juncture in the other direction beyond the plane of the first portion, see FIG. 9. A rail member 53 extends from the bottom surface of the portion 46 in the one direction and parallel to the straight edge 48. A bite block 54 is provided with a slot 55 for frictionally engaging the rail member 53 and is movable therealong.

The facing surfaces 56 and 57 of the channel 50 are spaced apart by a distance greater than the thickness of the film paquette 11 and each respective surface is provided with spaced, conical projections 58, see FIG. 9, for frictionally engaging the film paquette when it is inserted in the channel 50 in the same manner as described above with respect to slot 21 and the projections 24, 24a and 24b, the same conditions and alternative constructions being applicable. As shown in FIG. 9, the upper part of leg 52 is formed so as to engage the respective facing surface of the film paquette, thereby serving as a lateral support for maintaining it in its requesite exposure position.

The second portion 47 of the holder 45 is the same as the portion 17 described above in both shape and function. A number of index lines 59 are provided rather than only one. Since the portions 17 and 47 are alike, the indicator or pointer 13 can be used interchangeably with the same purpose and result. In order to retain the holder 45 in a steady manner, the bite block 54 can be moved along rail member 53 so as place it in a position in which the patient can exert a more satisfactory bite. As a result, the block 54 can be positioned to one side or the other of the central position of the film paquette 11.

In FIG. 10, the indicator 13 is disclosed as being integral with the second portion 17 or 47. The L-shaped extension is of a thickness sufficient to be substantially rigid and comprises a leg 60 and a leg 61 having an arrow or pointer 62 at its free end. FIG. 11 discloses another type of indicator or pointer in which the second portion 17 or 47 is provided with an integral extending lug 63. An L-shaped member 64 comprises a sleeve 65 at one end of an arm 66 and a leg 67 extending from the arm and having an arrow 68 at the free end thereof. The member 64 is interconnected to the portion 17 or 47 by the frictional engagement of sleeve 65 with lug 63. In order to permit the technician to make very accurate angular settings of the x-ray head, the pointer 13 can be mounted for such angular settings as shown in FIG. 12. The portion 17 or 47 is provided with a lug 70 which carries a bearing sleeve 71 having a central bore 72. The pointer 13 comprises an L-shaped extension 73 consisting of a leg 74 having an arrow 75 at its free end and an arm 76 that terminates in disc portion 77 from which a threaded member 78 extends. The threaded member 78 is mounted in sleeve 71 and the pointer is retained in any one of several positions when the nut 79 is turned to clamp the portion 77 against sleeve 71. The disc portion 77 is provided on the face thereof adjacent sleeve 71 with a number of angularly spaced radial lines, each of which corresponds to an angular position for the x-ray head and which is set relative to an index line or mark 80 on the sleeve 71. Such a setting of the pointer 13 eliminates any guess work on the part of the technician so as an end result, a more accurate setting of the x-ray head is obtained.

Since the holder 12 is used in substantially the same way as holder 10 and functions in substantially the same manner, a more detailed description of its operation is deemed not to be necessary in view of that already related above with resect to the holder 10. While the description of the invention has been with respect to preferred embodiments thereof, it will be understood that variations and modifications can be affected within the spirit and scope of the invention.

I claim:

1. An orally receptive device for retention between preselected teeth in the mouth of a person for supporting and maintaining an x-ray film paquette in proper exposure relation to at least one of the preselected teeth for making an exposure thereof, comprising:
- a thin, flat member having a first portion for insertion into the mouth and a second portion continuous and coextensive with the first portion for positioning the first portion in the exposure relationship when the first portion is provided with the film paquette;
- the first portion having a generally straight edge, a concave edge that intersects the straight edge and an intermediate area between the edges for engagement by the teeth to hold and maintain the member in the exposure relationship; and
- means for holding the film paquette substantially perpendicular to the plane of the member and in close proximity to the teeth comprising an elongated protuberance forming a part of the first portion, extending generally parallel to the straight edge and having at least two parallel facing surfaces of a length greater than the larger dimension of the film paquette and spaced so as to frictionally engage the film paquette when the latter is inserted therebetween.

2. An orally receptive device in accordance with claim 1 wherein the protuberance is arranged in the intermediate area spaced from and extending generally parallel to the straight edge and is provided with a slot of a length greater than the larger dimension of the film paquette and having parallell faces that are spaced so as to frictionally engage the film paquette when the latter is inserted therebetween.

3. An orally receptive device in accordance with claim 2 wherein the protuberance extends perpendicularly from each surface of the first portion to provide the slot with spaced engaging surfaces that are greater in the same dimensional sense as the thickness of the first portion.

4. An orally receptive device in accordance with claim 1 wherein the protuberance is arranged in the intermediate area spaced from and extending generally parallel to the straight edge and from each surface of the first portion, the protuberance being provided with an elongated slot having a length greater than the larger dimension of the film paquette and the facing surfaces thereof are spaced apart by a distance greater than the thickness of the film paquette and provided with spaced projections, the ends of which frictionally engage the film paquette when the latter is inserted therebetween.

5. An orally receptive device in accordance with claim 4 wherein the projections are generally conical in shape and alternately spaced along each facing surface and the respective planes of the apexes of the projections on each facing surface are spaced apart by a distance slightly less than the thickness of the film paquette.

6. An orally receptive device in accordance with claim 4 wherein the projections are generally semicylindrical in shape, of a length corresponding generally to the overall depth of the protuberance, and alternately spaced along each facing surface and the respective planes tangent to the projections on each facing surfa surface are spaced apart by a distance slightly less than the thickness of the film paquette.

7. An orally receptive device in accordance with claim 1 wherein the protuberance comprises a U-shaped extension having a short leg integral with the first portion along a part of the straight edge and a long leg spaced from and integral with the short leg, the facing surfaces of the legs forming an open-end channel with at least one of the facing surfaces of the short leg and the long leg is being provided with at least one pair of spaced projections for frictionally engaging one surface of the film paquette when the latter is inserted in the channel and between the projections and the other facing surface.

8. An orally receptive device in accordance with claim 7 wherein each of the facing surfaces of the short leg and the long leg is provided with the spaced projections.

9. An orally receptive device in accordance with claim 8 wherein the projections are generally conical in shape.

10. An orally receptive device in accordance with claim 8 wherein the projections are generally semicylindrical in shape.

11. An orally receptive device in accordance with claim 8 wherein the planes of the apexes of the projections on each facing surface are spaced from one another by a distance slightly less than the thickness of the film paquette.

12. An orally receptive device in accordance with claim 7 wherein the depth of the channel extends in a direction generally perpendicular to the plane of the first portion, and including a rail member extending from one surface of the first portion in the same direction and generally parallel to the straight edge and a block provided with a slot for frictionally engaging the rail member and engagable by the teeth for supporting and holding the device with the film paquette in proper exposure relation to the preselected teeth.

13. An orally receptive device in accordance with claim 12 wherein the block is movable along the rail member so as to permit the block to be positioned in a satisfactory bite location while maintaining the film paquette in the proper exposure relation to the preselected teeth.

* * * * *